(12) United States Patent
Li

(10) Patent No.: US 10,421,006 B1
(45) Date of Patent: Sep. 24, 2019

(54) SELF-BALANCING VEHICLE AND STRUCTURAL SUPPORT THEREIN

(71) Applicant: Bowen Li, Yongkang (CN)

(72) Inventor: Bowen Li, Yongkang (CN)

( * ) Notice: Subject to any disclaimer, the term of this patent is extended or adjusted under 35 U.S.C. 154(b) by 0 days.

(21) Appl. No.: 16/400,247

(22) Filed: May 1, 2019

(51) Int. Cl.
  *A63C 5/08* (2006.01)
  *A63C 17/01* (2006.01)
  *A63C 17/12* (2006.01)
  *A63C 17/00* (2006.01)

(52) U.S. Cl.
  CPC .......... *A63C 17/011* (2013.01); *A63C 17/002* (2013.01); *A63C 17/0093* (2013.01); *A63C 17/016* (2013.01); *A63C 17/12* (2013.01)

(58) Field of Classification Search
  CPC ... A63C 17/011; A63C 17/002; A63C 17/016; A63C 17/12; A63C 17/0093; A63C 17/00; A63C 17/01; B62K 11/007; B62K 11/00
  See application file for complete search history.

(56) References Cited

U.S. PATENT DOCUMENTS

| | | | | |
|---|---|---|---|---|
| 7,293,622 | B1 * | 11/2007 | Spital | A63C 17/12 180/180 |
| 8,028,777 | B2 * | 10/2011 | Kakinuma | A63C 17/08 180/218 |
| 8,403,083 | B2 * | 3/2013 | Waita | B62K 11/007 180/21 |
| 8,408,565 | B2 * | 4/2013 | An | A63C 17/0033 280/87.042 |
| 8,738,278 | B2 * | 5/2014 | Chen | B62K 11/007 701/124 |
| 9,376,155 | B2 | 6/2016 | Ying et al. | |
| 9,452,802 | B2 | 9/2016 | Ying et al. | |
| 9,499,228 | B2 * | 11/2016 | Chang | B62K 3/002 |
| 9,515,496 | B1 | 12/2016 | Ying | |
| 9,682,732 | B2 * | 6/2017 | Strack | B62K 11/007 |
| 9,840,302 | B2 * | 12/2017 | Zeng | B62K 11/007 |
| 9,896,146 | B2 * | 2/2018 | Lu | B60K 1/04 |
| RE46,964 | E | 7/2018 | Chen | |
| 10,035,557 | B2 | 7/2018 | Chang | |
| 10,059,397 | B2 | 8/2018 | Zheng et al. | |
| 10,065,103 | B2 | 9/2018 | Ma | |
| 10,144,477 | B2 * | 12/2018 | Lankford | B62K 11/007 |
| 10,167,036 | B2 * | 1/2019 | Ying | B62D 51/001 |
| 10,252,724 | B2 * | 4/2019 | Edney | B60W 40/13 |
| 10,322,766 | B2 * | 6/2019 | Chen | B62K 11/007 |
| 10,328,987 | B2 * | 6/2019 | Dai | B62K 3/002 |
| 10,335,669 | B2 * | 7/2019 | Ma | A63C 17/014 |
| 10,336,392 | B2 * | 7/2019 | Ying | B62D 51/001 |
| 2015/0096820 | A1 | 4/2015 | Strack | |
| 2017/0166278 | A1 * | 6/2017 | Lu | B60K 1/04 |
| 2017/0233023 | A1 * | 8/2017 | Chen | B62K 25/00 280/63 |
| 2017/0309874 | A1 * | 10/2017 | Hsia | H01M 2/1077 |

\* cited by examiner

*Primary Examiner* — James M Dolak

(74) *Attorney, Agent, or Firm* — Thomas W. Galvani, P.C.; Thomas W. Galvani

(57) ABSTRACT

A self-balancing vehicle includes a vehicle body having a housing with a top cover and a bottom cover. It includes a unitary support bar disposed between the top and bottom covers, about which the top and bottom covers are mounted, and which extends entirely along the top and bottom covers between opposed left and right ends of the unitary support bar. The vehicle further includes a left drive wheel and an opposed right drive wheel, each indirectly coupled to the unitary support bar.

15 Claims, 6 Drawing Sheets

SELF-BALANCING VEHICLE AND STRUCTURAL SUPPORT THEREIN

FIELD OF THE INVENTION

The present invention relates generally to vehicles, and more particularly to personal, self-balancing vehicles.

BACKGROUND OF THE INVENTION

In the past ten years, self-balancing vehicles have exploded in popularity. These vehicles sense slight forward and rearward pressure on a foot pad, indicating a rider's forward or rearward lean, and then rotate one or two wheels in response, thereby moving the vehicle and its rider forward or backward.

Self-balancing vehicles are compact; they are little more than two opposed, rugged wheels and a span of body between them. The body typically houses a battery, sensors, controllers, processors, speakers, and other electronic components. Nevertheless, reducing the size and weight of the body is always desirable.

SUMMARY OF THE INVENTION

A self-balancing vehicle includes a vehicle body having a housing with a top cover and a bottom cover. It includes a unitary support bar disposed between the top and bottom covers, about which the top and bottom covers are mounted, and which extends entirely along the top and bottom covers between opposed left and right ends of the unitary support bar. The vehicle further includes a left drive wheel and an opposed right drive wheel, each indirectly coupled to the unitary support bar.

The above provides the reader with a very brief summary of some embodiments discussed below. Simplifications and omissions are made, and the summary is not intended to limit or define in any way the scope of the invention or key aspects thereof. Rather, this brief summary merely introduces the reader to some aspects of the invention in preparation for the detailed description that follows.

BRIEF DESCRIPTION OF THE DRAWINGS

Referring to the drawings.

DETAILED DESCRIPTION

Figure 1:
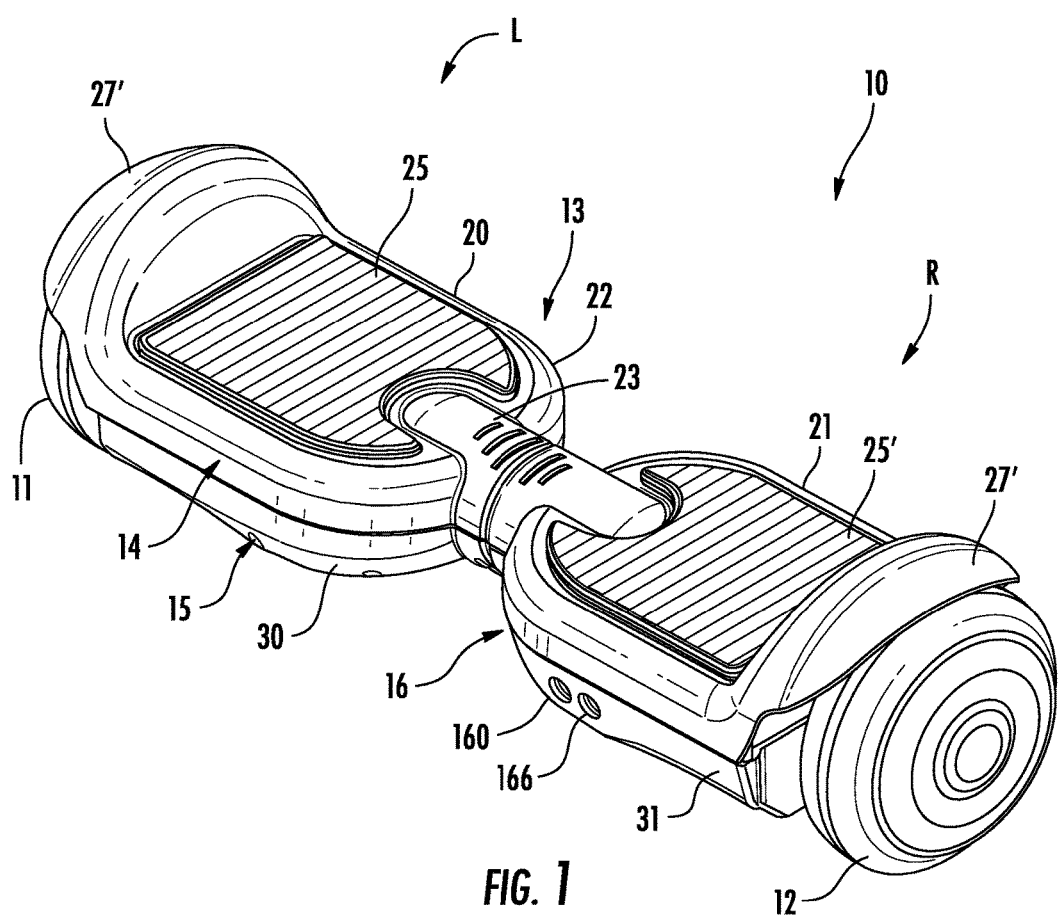
FIGS. 1 and 2 are top and bottom perspective views of a self-balancing vehicle.
Figure 2:
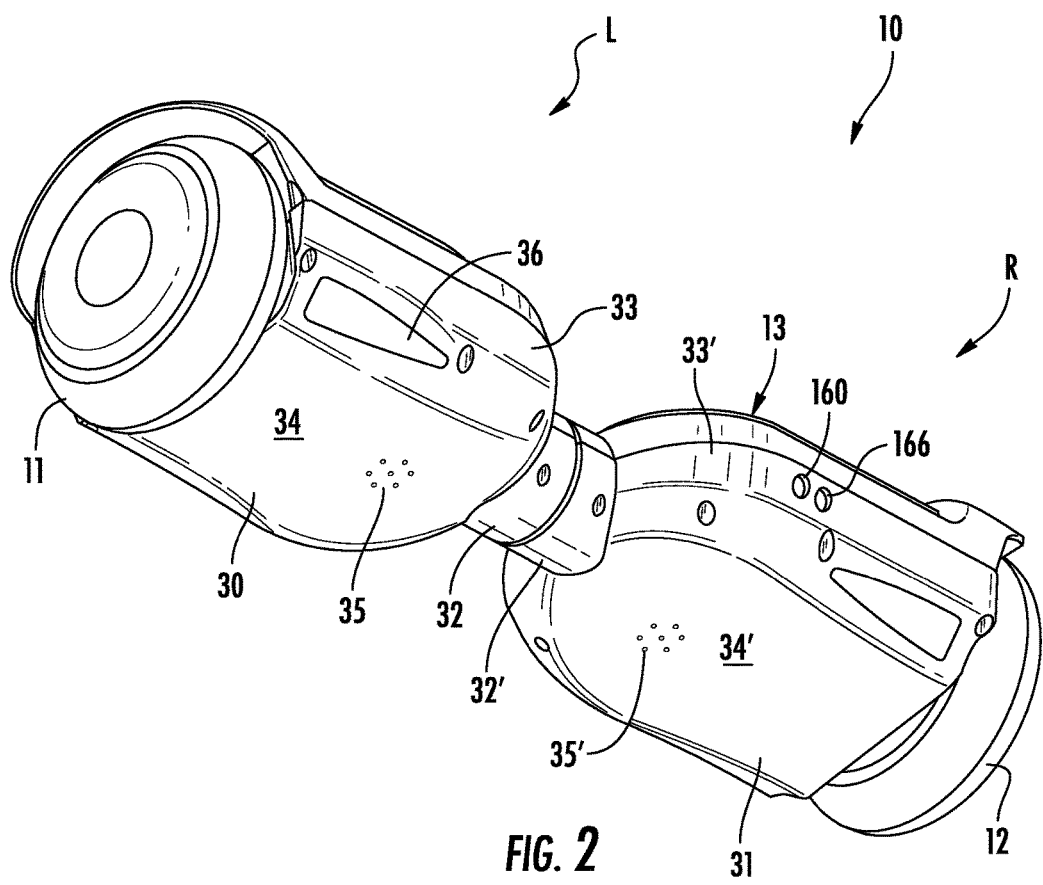

Reference now is made to the drawings, in which the same reference characters are used throughout the different figures to designate the same elements. FIGS. 1 and 2 are top and bottom perspective views illustrating a self-balancing vehicle (hereinafter, "vehicle" 10) including two rugged drive wheels 11 and 12 mounted to a body 13 which includes a housing 16 of a top cover 14 and a bottom cover 15. The vehicle 10 is nearly symmetric about a vertical plane of symmetry bisecting the vehicle into left and right halves, and as such, the description may refer to various structural elements and features as being on the left or the right, or may refer to various structural elements and features with the adjectives "left" or "right." For purposes of clarity, the left side of the vehicle 10 is identified in FIGS. 1 and 2 with an L and the right side is identified with an R. For example, the drive wheel 11 is a left drive wheel, and the drive wheel 12 is a right drive wheel 12.

Figure 3:
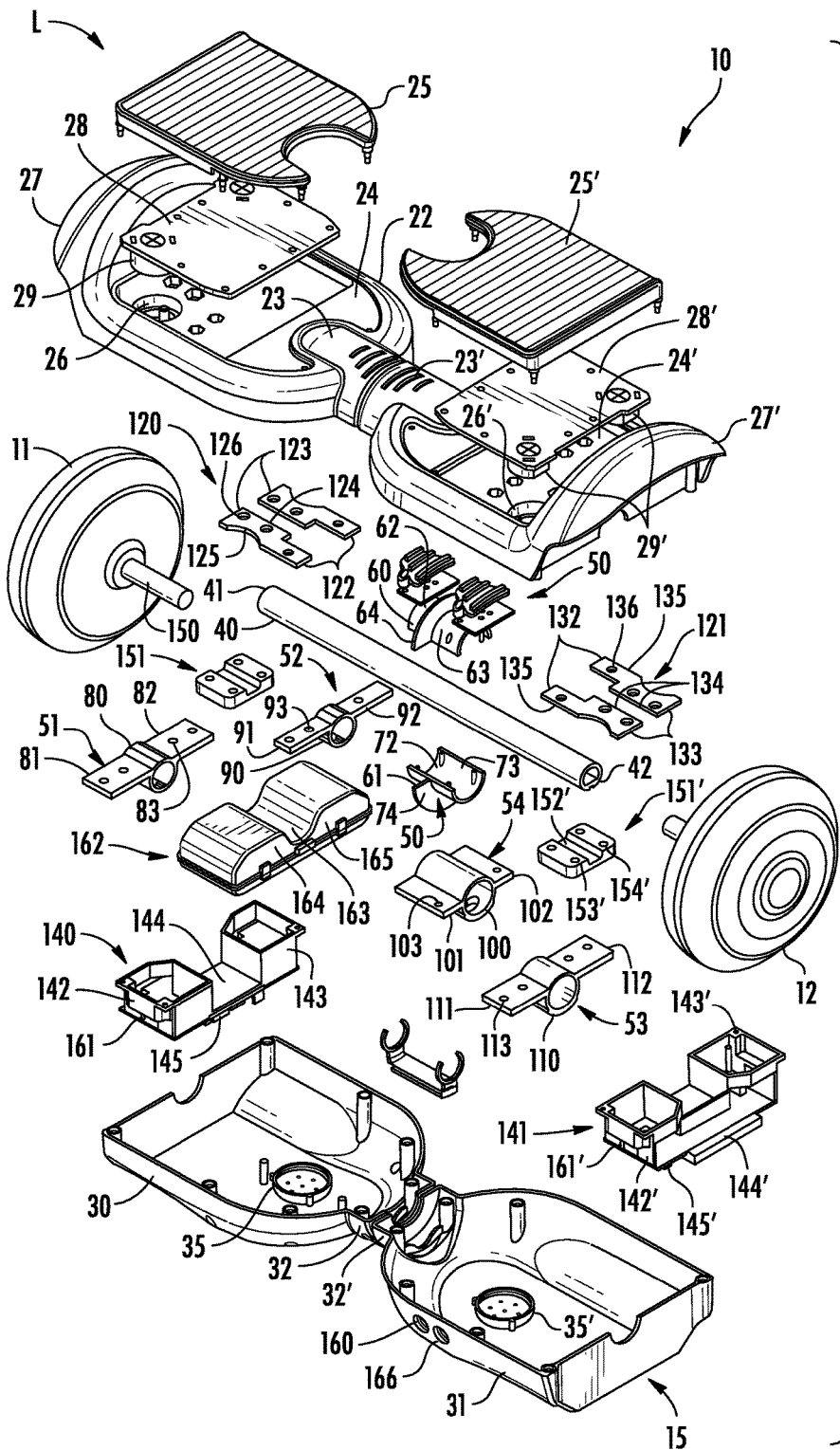
FIG. 3 is an exploded top perspective, exploded view of the self-balancing vehicle of FIG. 1.

The top cover 14 has a left top cover 20 and a right top cover 21 which are symmetric to each other and disposed opposite each other with respect to the plane of symmetry bisecting the vehicle 10. Because the left and right top covers 20 and 21 are nearly mirror identical, only the left top cover 20 will be described herein, with the understanding that the description applies equally to the right top cover 21. Indeed, the same reference characters are used for the various structural elements and features of both the left and right top covers 20 and 21, but those of the right top cover 21 are marked with a prime ("'") symbol to distinguish them from those of the left top cover 20. Referring to FIGS. 1-3, the left top cover 20 includes an inner semi-cylinder 22 extending outwardly from the plane of symmetry and an hour-glass-shaped base 23 integrally formed to the semi-cylinder 22. The base 23 includes a seat 24, depressed slightly below the top of the base 23, and a separate foot pad 25 received in the seat 24. The foot pad 25 is preferably a textured or grippy rubber pad on which the rider can stand while riding the vehicle 10.

In the seat 24, under the foot pad 25, are round fore and aft sensors 26. The fore sensors 26 are shown on both the left and right top covers 20 and 21 in FIG. 3; the aft sensors 26 are identical and just behind the fore sensors 26. A rigid plate 28 under the foot pad 25 has two depending protrusions 29 aligned with these sensors 26; when the rider stands on the left and right foot pads 25 and 25' and presses forward or rearward, the protrusions activate the sensors 26 and 26'. The sensors 26 are coupled in electrical communication with processors on printed circuit boards, which in turn send drive signals to the drive wheels 11 and 12. The left top cover 20 also includes the integrally-formed fender 27 which wraps over the top of the drive wheel 11, protecting the drive wheel 11 from the rider and protecting the rider from the drive wheel 11.

The left and right top covers 20 and 21 are top portions of the housing 16; they cover and protect the internal components of the vehicle 10 from dust and debris and provide a convenient location to receive a rider's feet. Notably, the top cover 15 does not include an inner top cover and an outer top cover; whereas some self-balancing vehicles employ an inner top cover or frame to provide rigidity, durability, and structural integrity to the vehicle and a top cover for decoration, beautification, or for holding foot pads, the vehicle 10 here does not require such an inner cover. Rather, structurally-reinforcing characteristics such as rigidity are achieved with other elements and features, as discussed below. As such, the main roles of the top cover 14 are to protect the vehicle 10 from the elements such as water, dust, and debris, and to carry the rider, but not to reinforce the structure of the vehicle 10.

The housing 16 also includes the bottom cover 15. The bottom cover 15 also protects the vehicle 10 from water, dust, and debris but does not primarily contribute to the rigidity or structural integrity of the vehicle 10. The bottom cover 15 has a left bottom cover 30 and a right bottom cover 31 which are symmetric to each other and disposed opposite each other with respect to the plane of symmetry bisecting the vehicle 10. Because the left and right bottom covers 30 and 31 are nearly mirror identical, only the left bottom cover 30 will be described herein, with the understanding that the description applies equally to the right bottom cover 31. Indeed, the same reference characters are used for the various structural elements and features of both the left and right bottom covers 30 and 31, but those of the right bottom cover 15 are marked with a prime ("'") symbol to distinguish them from those of the left bottom cover 30. Referring to FIGS. 1-3, the left bottom cover 30 includes an inner semi-cylinder 32 extending outwardly from the plane of symmetry, and an hour-glass-shaped base 33 integrally formed to the semi-cylinder 32. The base 33 has a flat bottom 34 which is formed with several perforations 35 for emitting sound from a speaker behind the perforations. The base 33 additionally has a shaped lens 36 for a light.

The left and right bottom covers 30 and 31 are bottom portions of the housing 16; they cover and protect the internal components of the vehicle 10 from dust and debris. They are, however, little more than hard shells. Notably, the bottom cover 15 does not include an inner bottom cover and an outer bottom cover; whereas some self-balancing vehicles employ an inner bottom cover or frame to provide rigidity, durability, and structural integrity to the vehicle and a bottom cover for decoration or beautification, the vehicle 10 here does not require such an inner cover. Rather, as mentioned above, structurally-reinforcing characteristics such as rigidity are achieved with other elements and features, as discussed below. As such, the main role of the bottom cover 15 is to protect the vehicle 10 from the elements such as water, dust, and debris, but not to reinforce the structure of the vehicle 10.

Figure 4:
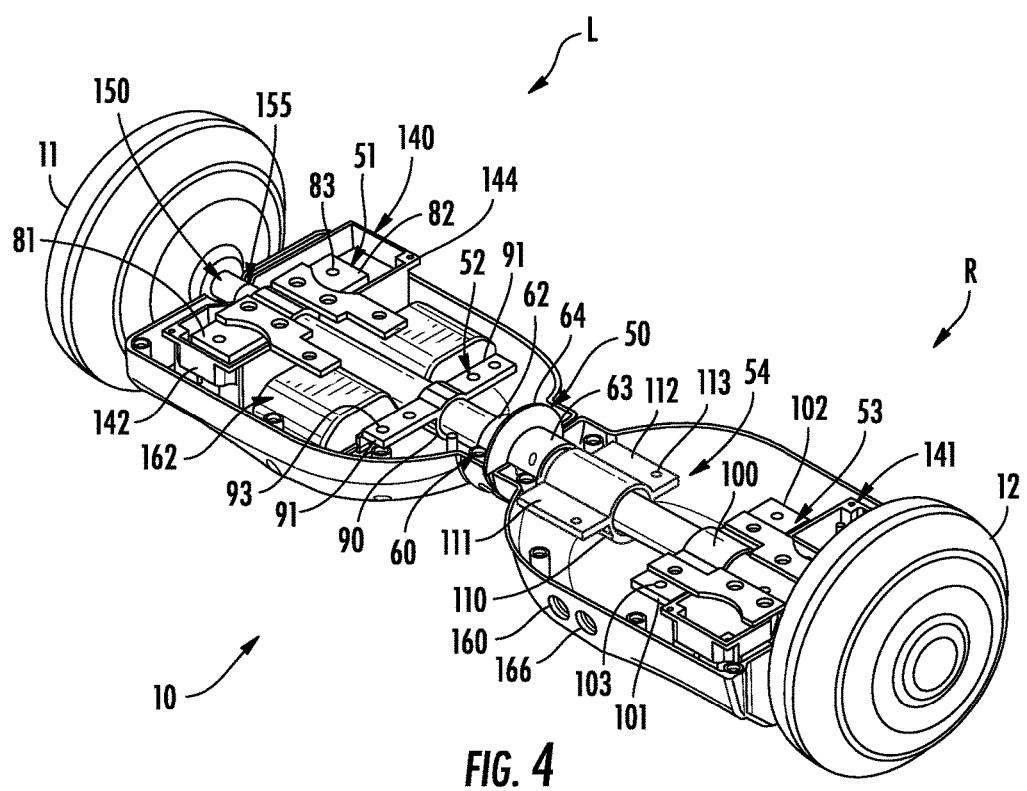
FIG. 4 is a top perspective view of the self-balancing vehicle of FIG. 1 with a top cover removed.
Figure 5:
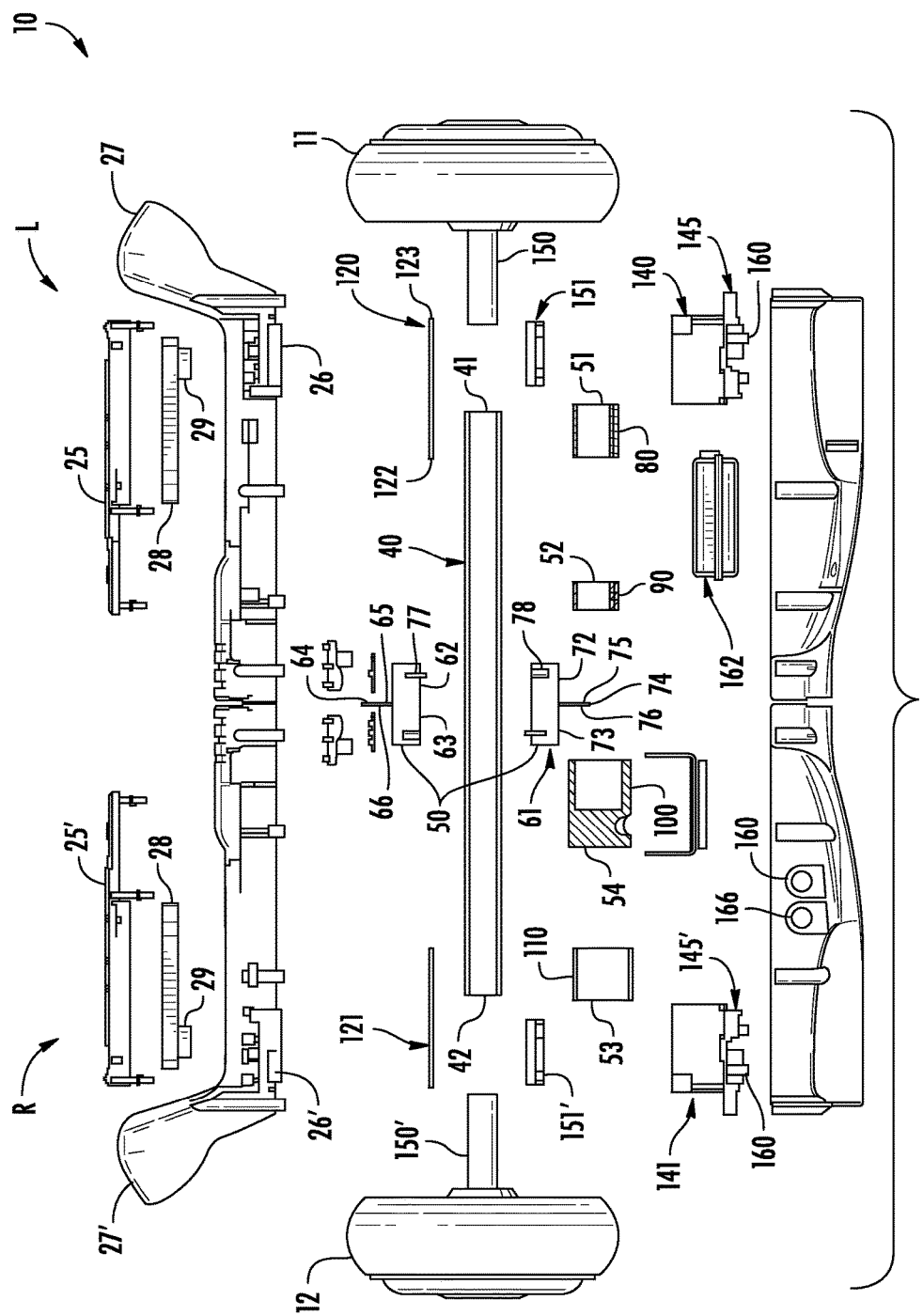
FIG. 5 is an exploded front elevation view of the self-balancing vehicle of FIG. 1.

The vehicle 10 carries its structural, electrical, and mechanical elements and features within the housing 16. Reference is made primarily with respect to FIGS. 3, 4, and 5 (note that FIG. 5 is reversed with respect to the other figures; the left and right sides are oppositely arranged on the page). A unitary support bar 40 is disposed within the housing 16, between the top and bottom covers 14 and 15 and extending entirely along the top and bottom covers 14 and 15 between opposed left and right ends 41 and 42 of the support bar 40. The left end 41 of the support bar 40 extends entirely to just below the left fender 27, and the right end 42 of the support bar 40 extends entirely to just below the right fender 27'. Along this length, the support bar 40 is unitary: it is continuous, unbroken, and uninterrupted. It is integral and monolithic along its full length between the opposed left and right ends 41 and 42. The support bar 40 is a hollow cylindrical tube, constructed from a material or combination of materials having high strength, durability, and rigidity, such as steel, aluminum, titanium, carbon fiber, and the like. The support bar 40 is very strong and is payload-bearing: it is capable of carrying the weight of a large rider on the vehicle 10 without bending, yielding, breaking, or rendering the vehicle inoperative.

The support bar 40 is disposed medially in the housing 16; it is equidistant from the front of the housing 16 and the back of the housing 16, and is thus coaxial to the drive wheels 11 and 12 and is flanked by the fore and aft sensors 26 on both the left and right sides L and R of the vehicle 10. The foot pads 25 and 25' and the plates 28 and 28' are registered directly above the support bar 40 and are each symmetric with respect to it. The top and bottom covers 14 and 15 are each coupled to the support bar 40 and rely on its rigid and strong material characteristics to provide strength and rigidity to the entire vehicle 10. Indeed, but for the small support assemblies engaging the top and bottom covers 14 and 15 to the support bar 40, the support bar 40 is not coupled to any other part of the vehicle 10, provides reinforcement to no other part of the vehicle 10, and yet supports the entire vehicle 10 without assistance from secondary frame elements such as an inner top cover or frame, or an inner bottom cover or frame.

Indeed, these support assemblies are structures separate from each of the support bar 40, the top cover 14, and the bottom cover 15, are coupled to the top and bottom covers 14 and 15, and, in turn, couple the top and bottom covers 14 and 15 to the support bar 40. The support assemblies include a medial support collar 50, an outer left bracket 51, an inner left bracket 52, an outer right bracket 53, and an inner right bracket 54. Each of these support assemblies encircles the support bar 40 and transfers loads from the housing 16 directly and solely to the support bar 40.

The medial support collar 50 is located in the middle of the vehicle 10, halfway between the drive wheels 11 and 12, and at the middle of the length of the support bar 40. It is an assembly, constructed from two separate pieces: an upper collar 60 and an opposed lower collar 61. The upper collar 60 is most clearly seen in FIG. 4. The upper collar 60 includes semi-cylindrical left and right covers 62 and 63, with a coaxial, centrally interposed, semi-annular flange 64 projecting radially outward from between them. The left and right covers 62 and 63 have a smaller outer diameter than does the flange 64, though the covers 62 and 63 and the flange 64 have a coextensive inner diameter corresponding to the outer diameter of the support bar 40. The left and right covers 62 and 63 are preferably integrally formed to the flange 64 as a single piece. The flange 64 has opposed faces 65 and 66.

The lower collar 61 is more clearly seen in FIGS. 3 and 5. The lower collar 61 includes semi-cylindrical left and right covers 72 and 73, with a coaxial, centrally interposed, semi-annular flange 74 projecting radially outward from between them. The left and right covers 72 and 73 have a smaller outer diameter than does the flange 74, though the covers 72 and 73 and the flange 74 have a coextensive inner diameter corresponding to the outer diameter of the support bar 40 and also corresponding to the inner diameter of the upper collar 60. The left and right covers 72 and 73 are preferably integrally formed to the flange 74 as a single piece. The flange 74 has opposed faces 75 and 76.

The upper and lower collars 60 and 61 fit together around the support bar 40, and are fastened together by screws or other fasteners 77 through holes 78. When so fastened, the upper and lower collars 60 and 61 form the medial support collar 50 on the support bar 40, and the top and bottom covers 14 and 15 are spaced apart from each other slightly by the annular flanges 64 and 74 extending radially outward from between the left and right portions of the top and bottom covers 14 and 15. This prevents the left and right portions of the top and bottom covers 14 and 15 from rubbing and wearing against each other.

The outer left bracket 51, best seen in FIGS. 3 and 4, is also fit to the support bar 40. The bracket 51 includes a cylindrical body 80 having a relatively short length between inner and outer ends (the outer end is directed toward the drive wheel and the inner end is directed toward the drive wheel 12). Generally, it is noted that the dimension "length" is referred to herein with respect to a direction along or parallel to the support bar 40, as it was used and described with respect to the support bar 40. Opposed flanges 81 and 82 extend outwardly from the cylindrical body 80. The flanges 81 and 82 are rectangular, and they extend from the body 80, not from a central location, but rather from just above the midline of the body 80, or closer to the top cover 14 than to the bottom cover 15. The flanges 81 and 82 are coextensive and have transverse holes 83 extending through them. The bracket 51 has a width (transverse to its length) extending between the ends of the flanges 81 and 82.

The inner left bracket 52 is closer to the drive wheel 12 and further from the drive wheel 11 than is the outer left bracket 51. Like the outer left bracket 51, the bracket 52 includes a cylindrical body 90 having a relatively short length between inner and outer ends (the outer end is directed toward the drive wheel 11 and the inner end is directed toward the drive wheel 12). Opposed flanges 91 and 92 extend outwardly from the cylindrical body 80. The flanges 91 and 92 are rectangular, and they extend from the body 90, not from a central location, but rather just above the midline of the body 90. The flanges 91 and 92 are coextensive and have transverse holes 93 extending through them. The bracket 52 has a width (transverse to its length) extending between the ends of the flanges 91 and 92; this width is equal to that of the bracket 51.

The inner right bracket 54 is closer to the drive wheel 12 and further from the drive wheel 11 than is the inner left bracket 52, and indeed, the inner right bracket 54 is spaced apart from the inner left bracket 52 by the medial support collar 50. Like the inner left bracket 52, the bracket 54 includes a cylindrical body 100 having a relatively short length between inner and outer ends (the outer end is directed toward the drive wheel and the inner end is directed toward the drive wheel 11). Opposed flanges 101 and 102 extend outwardly from the cylindrical body 100. The flanges 101 and 102 are rectangular, and they extend from the body 100, not from a central location, but rather from just above the midline of the body 100. The flanges 101 and 102 are coextensive and have transverse holes 103 extending through them. The bracket 54 has a width (transverse to its length) extending between the ends of the flanges 101 and 102; this width is less than that of the brackets 51 and 52.

The outer right bracket 53 is closer to the drive wheel 12 and further from the drive wheel 11 than is the inner right bracket 54. Like the inner right bracket 54, the bracket 53 includes a cylindrical body 110 having a relatively short length between inner and outer ends (the outer end is directed toward the drive wheel 12 and the inner end is directed toward the drive wheel 11). Opposed flanges 111 and 112 extend outwardly from the cylindrical body 110. The flanges 111 and 112 are rectangular, and they extend from the body 110, not from a central location, but rather from just above the midline of the body 110. The flanges 111 and 112 are coextensive and have transverse holes 113 extending through them. The bracket 53 has a width (transverse to its length) extending between the ends of the flanges 111 and 112; this width is equal to the widths of the brackets 51 and 52 and less than that of the bracket 54.

Each of the brackets 51-54 encircles the support bar 40 and is then attached to the support bar 40 with at least one set screw. Thus, each bracket 51-54 is prevented from moving axially or rotationally with respect to the support bar 40 before, during, and after use of the vehicle 10. Indeed, the support bar 40 and the brackets 51-54 operate as a single piece when they are fastened with the set screws. Since the brackets 51-54 are fixed to the top and bottom covers 14 and 15, the support bar 40 is fixed against rotation with respect to the top and bottom covers 14 and 15 of the housing 16.

The inner left and right brackets 52 and 54 are secured directly to the top and bottom covers 14 and 15. Since there is no inner top cover or frame, nor an inner bottom cover or frame, the brackets 52 and 54 are secured directly to the top and bottom covers 14 and the support bar 40 to provide rigidity and structural integrity to the top and bottom covers 14 and 15. Fasteners are passed through the holes 93 and 103 into sockets in the top and bottom covers 14 and 15 to engage them with the brackets 52 and 54 and thus also with the support bar 40.

The outer left and right brackets 51 and 53 are secured to the top and bottom covers 14 and 15 as well. A set of plates secures the brackets 51 and 53 to the top cover 14. A set of left plates 120 couples the outer left bracket 51 to the top cover 14, and a set of right plates 121 couples the outer right bracket 53 to the top cover 14. The left plates 120 are best seen in FIGS. 3-5. They are thin and elongate, extending lengthwise along the support bar 40. The two left plates 120 are identical, and so the description herein refers to both, but neither one specifically. The left plate 120 includes an inner end 122 and an opposed outer end 123, as well as opposed inner and outer sides 124 and 125. The inner and outer ends 122 and 123 are both short, flat, and parallel. The inner end 122 is directed toward the medial support collar 50, while the outer end 123 is directed outward toward the drive wheel 11. The inner side 124 is directed toward the support bar 40, while the outer side 125 is directed outward away from the support bar 40, toward the housing 16. The inner side 124 is rectilinear and stepped. The inner side 124 extends from the outer end 123 transverse to the outer end 123, then is spaced back, away from the support bar 40 proximate the inner end 124. The outer side, 125, proximate the outer end 123, is arcuate and concave, extending inward into the body of the left plate 120 and toward the support bar 40. Then, at approximately the same point that the inner side 124 is spaced back, the outer side 125 extends linearly to the inner end 122 in a direction parallel to the inner side 124. A plurality of holes 126 are formed entirely through the left plate 120, allowing the left plate 120 to be fastened to the outer left bracket 51. The left plate 120 is secured to the outer left bracket 51 proximate the inner end 122, and the outer end 123 of the left plate 120 is proximate the drive wheel 11. Thus, proximate the outer end 123, the inner side 124 of the left plate 120 is closely received against the axle of the drive wheel 11, and the outer side 125 is closely received against the round sensors 26. Moreover, proximate the outer end 123, the left plate 120 is directly received against the left top cover 20. Again, there are two left plates 120—a fore and an aft plate 120—one in front of and one behind the support bar 40. As such, the left plates 120 flank the support bar 40 and the axle of the drive wheel 11 and are respectively flanked by the fore and aft sensors 26.

The right plates 121 are best seen in FIGS. 3-5. They are thin and elongate, extending lengthwise along the support bar 40. The two right plates 121 are identical, and so the description herein refers to both, but neither one specifically. The right plate 121 includes an inner end 132 and an opposed outer end 133, as well as opposed inner and outer sides 134 and 135. The inner ends 132 and 133 are both short, flat, and parallel. The inner end 132 is directed toward the medial support collar 50, while the outer end 133 is directed outward toward the drive wheel 12. The inner side 134 is directed toward the support bar 40, while the outer side 135 is directed outward away from the support bar 40, toward the housing 16. The inner side 134 is rectilinear and stepped. The inner side 134 extends from the outer end 133 transverse to the outer end 133, then is spaced back, away from the support bar 40 proximate the inner side 134. The outer side, 135, proximate the outer end 133, is arcuate and concave, extending inward into the body of the right plate 121 and toward the support bar 40. Then, at approximately the same point that the inner side 134 is spaced back, the outer side 135 extends linearly to the inner end 132 in a direction parallel to the inner side 134. A plurality of holes 126 are formed entirely through the right plate 121, allowing the right plate 121 to be fastened to the outer right bracket 53. The right plate 121 is secured to the outer right bracket 53 proximate the inner end 132, and the outer end 133 of the right plate 121 is proximate the drive wheel 12. Thus, proximate the outer end 133, the inner side 134 of the right plate 121 is closely received against the axle of the drive wheel 12, and the outer side 135 is closely received against the round sensors 26. Moreover, proximate the outer end 133, the right plate 121 is directly received against the right top cover 21. Again, there are two right plates 121—a fore and an aft plate 121—one in front of and one behind the support bar 40. As such, the right plates 121 flank the support bar 40 and the axle of the drive wheel 12 and are respectively flanked by the fore and aft sensors 26.

Supports 140 and 141 secure the brackets 51 and 53 to the bottom cover 15. The supports 140 and 141 are identical and only the left support 140 will be described with the understanding that the description applies equally to the right support 141. The structural elements and features of the right support 141 are identified with the same reference characters as those of the left support 140 but are marked with a prime ("'") symbol to distinguish them from those of the left support 140. The support 140 generally has a wide U shape, including two upstanding posts 142 and 143 and a bridge 144 between them. The support 140 is a hollow, having a thin and monolithic sidewall. The open tops of the posts 142 and 143 are mounted to the top cover 14 just under and outside of the sensors 26. On the underside of the support 140, as shown only in FIG. 5, is a main control or printed circuit board ("PCB") 145. This PCB 145 is electrically coupled to the sensors 26 on the left portions of the top and bottom covers 14 and 15, the drive wheel 11, and to other parts of the vehicle 10 (note: coupling wires and cables are not shown in any of the drawings for the sake of simplicity; it is expected that one having ordinary skill in the art will understand the nature of such connections from this written description alone).

Similarly, the PCB 145' is electrically coupled to the sensors 26' on the right portions of the top and bottom covers 14 and 15, the drive wheel 12, and to other parts of the vehicle 10. The following description, made with reference to FIG. 3, more easily describes the right side of the vehicle 10; however, one having ordinary skill will understand that applies equally to the left side. The drive wheel 12 is controlled by the PCB 145'. The drive wheel 12 contains a tire and an internal motor. An axle 150' extends inwardly from the drive wheel 12. The drive wheel 12 rotates with respect to the axle 150'. The axle 150' is held within the housing 16 and prevented from rotational movement with respect to the housing 16. The axle 150' is held against the inner sides 134 of each of the right plates 121, as mentioned above. Moreover, a receiving plate 151' receives and holds the axle 150' stationary. It includes an inset channel 152' and two upstanding, parallel ridges 153' and 154' flanking and thus defining the inset channel 152'. The axle 150' is laid into the receiving plate 151', snugly received in the receiving channel 152' and between the ridges 153' and 154', and the receiving plate 151' is then fastened to the underside of the right plates 121. The axle 150' does not actually engage or extend into the support bar 40—there is an axial or lateral gap 155 between the axle 150' and the right end 42 of the support bar 40—but is coupled to the right end 42 of the support bar 40 through the receiving plate 151' and the right plates 121. In this way, the drive wheel 12 is securely engaged to the housing 16. The drive wheel 11 is similarly engaged to the housing 16 on the left side by the receiving plate 151.

Figure 6:
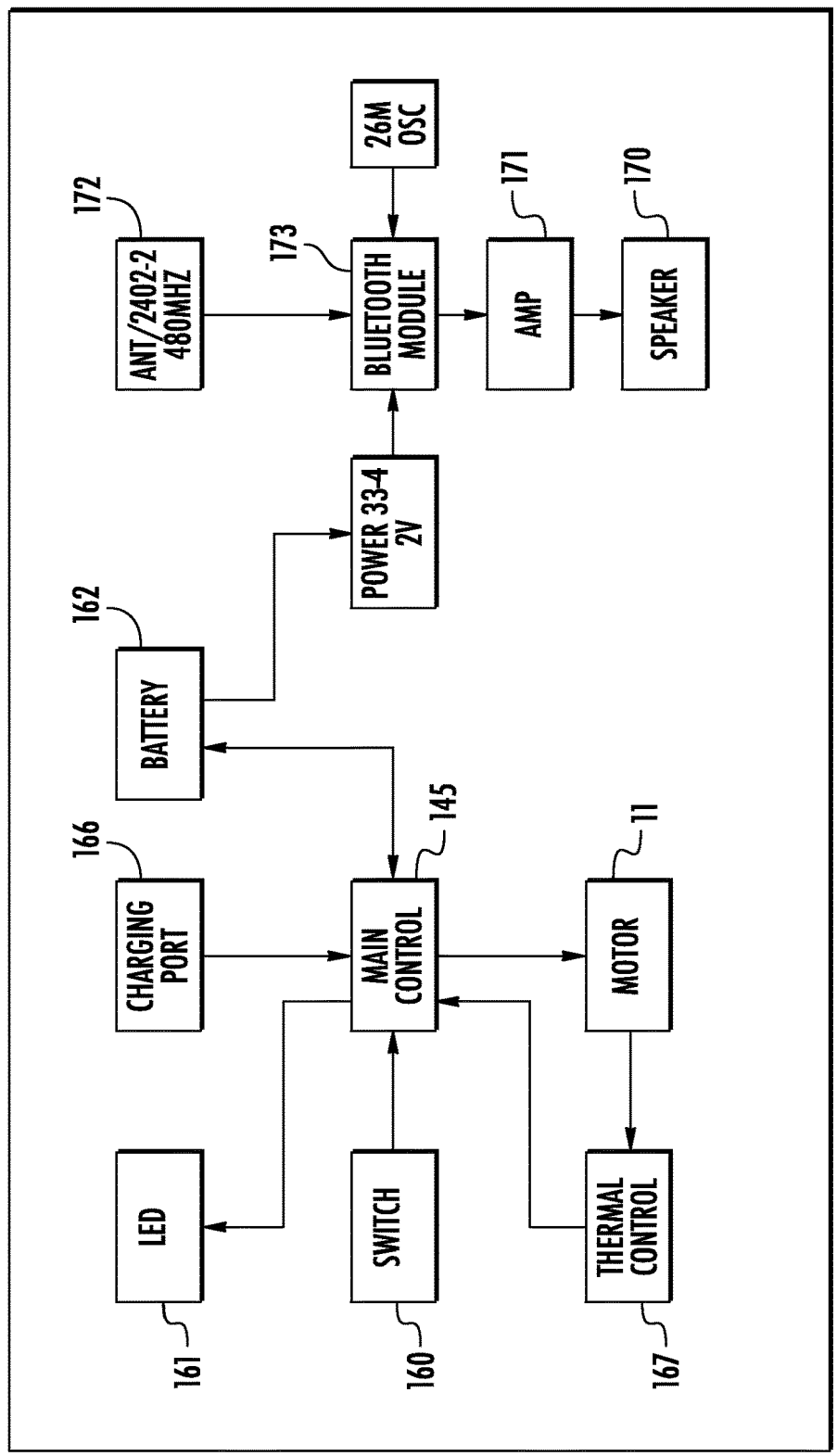
FIG. 6 is a generalized circuit diagram of the self-balancing vehicle.

Referring now to FIGS. 3-5 still but also to FIG. 6, the PCBs 145 and 145' are pre-programmed with a set of instructions. The PCBs 145 and 145' control the drive wheels 11 and 12 in response to a number of inputs from the vehicle 10. For instance, the PCBs 145 and 145' control the drive wheels 11 and 12 in response to input from the sensors 26. The PCBs 145 and 145' are energized in response to depression of an on/off switch 160. When energized, the PCBs 145 will light an LED 161 or LEDs disposed behind the lenses 36 to identify that the vehicle 10 is on. Power to the PCBs 145 and 145' is provided from a battery 162. The battery 162 is large, but fits within the housing 16 because of a central depression 163 receiving the support bar 40 and spacing apart and separating the battery into two enlarged lobes 164 and 165 fit into the housing 16 on either side of the support bar 40. The battery 162 is charged via a charging port 166, and the PCBs 145 and 145' regulate the charging of the battery 162 and prevent overcharge. Moreover, thermal sensors or thermal control 167, monitor the temperatures of the drive wheels 11 and 12, the PCBs 145 and 145 themselves, and the battery 162; the PCBs 145 and 145' shut down the vehicle if an excess temperature is detected.

The PCBs 145 and 145' are also electrically coupled to a speaker 170, powered by a digital amplifier 171, as well as an antenna 172 for Bluetooth communications, powered by a Bluetooth module 173. These allow the vehicle 10 to receive information and instructions from a Bluetooth-enabled device, such as a mobile phone or tablet device, play music, emit auditory alerts, etc.

In some embodiments, the PCBs transmit an electronic signal to the drive wheels 11 and 12 to instruct them to rotate, in what direction, with what acceleration, and to what speed. In other embodiments, the PCBs transmit an electronic signal to the drive wheels 11 and 12, and logic or another PCB within the drive wheels 11 and 12 receives the signal and controls the drive wheel accordingly.

A preferred embodiment is fully and clearly described above so as to enable one having skill in the art to understand, make, and use the same. Those skilled in the art will recognize that modifications may be made to the description above without departing from the spirit of the invention, and that some embodiments include only those elements and features described, or a subset thereof. To the extent that modifications do not depart from the spirit of the invention, they are intended to be included within the scope thereof.

The invention claimed is:

1. A self-balancing vehicle comprising:
   a top cover comprising a left top cover and a right top cover;
   a bottom cover comprising a left bottom cover and a right bottom cover;
   a unitary support bar disposed between the top and bottom covers, about which the top and bottom covers are mounted, and which extends entirely along the top and bottom covers between opposed left and right ends of the unitary support bar;
   support assemblies, separate from each of the unity support bar, the top cover, and the bottom cover, wherein the support assemblies are coupled to the top and bottom covers and couple the top and bottom covers to the unitary support bar, and the support assemblies comprise a medial support collar, an outer left bracket, an inner left bracket, an inner right bracket, and an outer right bracket; and a left drive wheel and an opposed right drive wheel, each coupled to the respective left and right ends of the unitary support bar.

2. The vehicle of claim 1, wherein the support bar is fixed against rotation with respect to the top and bottom covers.

3. The vehicle of claim 1, wherein there is a lateral gap between axles of each of the left and right drive wheels and the respective left and right ends of the unitary support bar.

4. The vehicle of claim 1, wherein the unitary support bar is payload-bearing.

5. The vehicle of claim 1, further comprising a battery electrically coupled to the left and right drive wheels, wherein the battery includes a central depression receiving the unitary support bar and spacing apart two opposed lobes of the battery about the unitary support bar.

6. A self-balancing vehicle comprising:
a top cover comprising a left top cover and a right top cover;
a bottom cover comprising a left bottom cover and a right bottom cover;
a unitary support bar disposed between the top and bottom covers, about which the top and bottom covers are mounted, and which extends entirely along the top and bottom covers between opposed left and right ends of the unitary support bar;
support assemblies, separate from each of the unity support bar, the top cover, and the bottom cover, wherein the support assemblies are coupled to the top and bottom covers and couple the top and bottom covers to the unitary support bar, and the support assemblies include a medial support collar, an outer left bracket, an inner left bracket, an inner right bracket, and an outer right bracket; and
a left drive wheel and an opposed right drive wheel, each indirectly coupled to the unitary support bar.

7. The vehicle of claim 6, wherein the support bar is fixed against rotation with respect to the top and bottom covers.

8. The vehicle of claim 6, wherein there is a lateral gap between axles of each of the left and right drive wheels and the respective left and right ends of the unitary support bar.

9. The vehicle of claim 6, wherein the unitary support bar is payload-bearing.

10. The vehicle of claim 6, further comprising a battery electrically coupled to the left and right drive wheels, wherein the battery includes a central depression receiving the unitary support bar and spacing apart two opposed lobes of the battery about the unitary support bar.

11. A self-balancing vehicle comprising:
a vehicle body comprising a housing including a top cover and a bottom cover;
a unitary support bar disposed within the housing, about which the top and bottom covers are mounted, and which extends entirely along the top and bottom covers between opposed left and right ends of the unitary support bar;
support assemblies, separate from each of the unity support bar, the top cover, and the bottom cover, wherein the support assemblies are coupled to the top and bottom covers and couple the top and bottom covers to the unitary support bar, and the support assemblies include a medial support collar, an outer left bracket, an inner left bracket, an inner right bracket, and an outer right bracket; and
a left drive wheel and an opposed right drive wheel, each indirectly coupled to the unitary support bar.

12. The vehicle of claim 11, wherein the support bar is fixed against rotation with respect to the top and bottom covers.

13. The vehicle of claim 11, wherein there is a lateral gap between axles of each of the left and right drive wheels and the respective left and right ends of the unitary support bar.

14. The vehicle of claim 11, wherein the unitary support bar is payload-bearing.

15. The vehicle of claim 11, further comprising a battery electrically coupled to the left and right drive wheels, wherein the battery includes a central depression receiving the unitary support bar and spacing apart two opposed lobes of the battery about the unitary support bar.

* * * * *